July 18, 1967  S. HAHN  3,331,144
TEACHING APPARATUS
Filed Sept. 10, 1965  2 Sheets-Sheet 1

INVENTOR.
STEVEN HAHN
BY
*W.D. Keith*
ATTORNEY

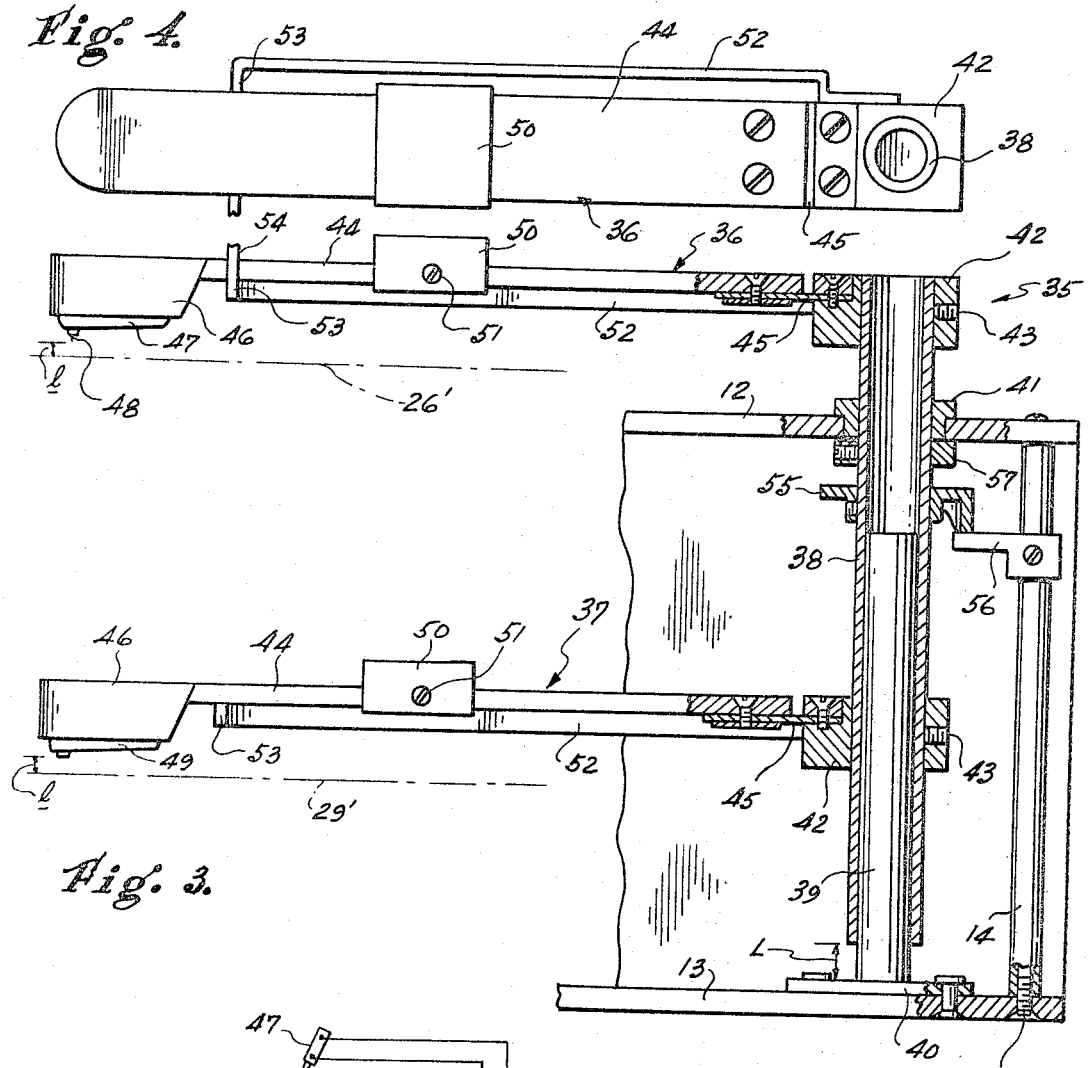
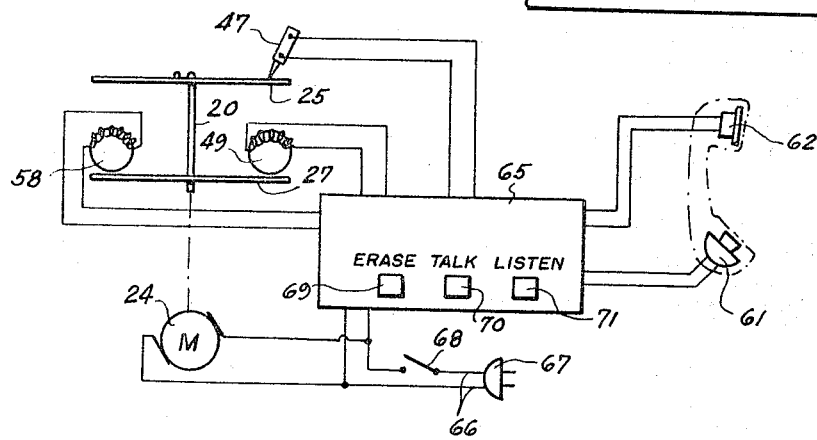
Fig. 4.
Fig. 3.
Fig. 5.
INVENTOR.
STEVEN HAHN
BY
W.D.Keith
ATTORNEY United States Patent Office 3,331,144
Patented July 18, 1967

3,331,144
TEACHING APPARATUS
Steven Hahn, New York, N.Y., assignor to Round Hill Associates, Inc., New York, N.Y., a corporation of New York
Filed Sept. 10, 1965, Ser. No. 486,412
14 Claims. (Cl. 35—35)

This invention relates to a recording and reproducing apparatus useful as an aid in the teaching and learning of languages and other subject matter.

Various types of apparatus have been heretofore provided for use in the teaching and learning of languages and other subjects. Such existing apparatus is usually in the form of a magnetic tape recorder employing a two-track magnetic tape, with one of the tape tracks, referred to as the master track, having a lesson prerecorded thereon and the other tape track being intended to receive a magnetic recording of the student's responses to the lesson or other instructional material on the master track. In some instances, the tape track which receives the student responses also has the lesson or instructional material rerecorded therein between the student responses so that the original lesson and the responses thereto can be played back from a single track of the tape.

Although the above described teaching apparatus in a form of a magnetic tape recorder functions well, it has a number of distinct disadvantages. First of all, the prerecorded magnetic tape, which is usually in the form of a continuous loop or belt in a cartridge, is quite expensive, even when produced in larged quantities of the order of 100,000 or more. The high cost of the prerecorded magnetic tapes is particularly disadvantageous when it is desired to use the teaching apparatus for home study purposes or in connection with correspondence courses. If the magnetic tape recorder is provided with devices for effecting the fast-forward or reverse feeding movement of the tape, such devices increase the complexity and cost of the apparatus to a point where it is not economically feasible for use in home study or correspondence courses. On the other hand, if devices for effecting the fast-forward or reverse feeding movement of the tape are omitted for economic reasons, the student cannot conveniently "skip" about the lesson, that is, the student cannot return to any portion of the prerecorded instructional material on the master track to remonitor the same, nor can the student return to a previously recorded response for checking or revising the same. Further, magnetic tapes are susceptible to binding or breaking, particularly when in the form of an endless loop or belt contained in a cartridge.

Accordingly, it is an object of this invention to provide a recording and reproducing apparatus for use in the teaching and learning of languages and other subjects, and which avoids the above-mentioned disadvantages of the existing apparatus provided for that purpose.

Another object is to provide a relatively simple teaching apparatus which can be produced and distributed at relatively low cost and which employs a low cost, spirally grooved phonograph disk or record having the lesson or instructional material prerecorded thereon, so that the teaching apparatus can be economically utilized in connection with home study or correspondence courses.

In accordance with an important aspect of this invention, the spirally grooved phonograph disk having the lesson or instructional material prerecorded thereon is removably supported by a rotary turntable and has its groove engageable by the stylus of a conventional phonograph pick-up which is movable toward and away from the phonograph disk and also radially with respect to the latter so as to permit tracking of the spiral groove, a magnetic memory disk is coupled with the turntable to rotate coaxially therewith, and a magnetic head for recording magnetically on the memory disk and for playing back such magnetic recording is mechanically connected with the pick-up to move with the latter, whereby, as the pick-up tracks the spiral groove of the phonograph disk on the turntable, the magnetic recording and play-back head is made to track a corresponding spiral recording path on the memory disk.

Since the magnetic recording and play-back head is mechanically connected to the pick-up, and thus positionally synchronized with respect to the latter, the pick-up can be manually positioned to have its stylus engage any desired portion of the prerecorded phonograph disk with the assurance that the magnetic recording and play-back head will be disposed at a corresponding position along the spiral recording path on the magnetic memory disk. Thus, the student can "skip" about the lesson merely by manually positioning the pick-up as desired with respect to the prerecorded phonograph disk. The mechanical connection between the magnetic recording and playback head and the pick-up further serves to minimize the cost of the apparatus in that the spiral groove of the prerecorded phonograph disk thereby acts to cause feeding movement of the magnetic head, that is, tracking of a corresponding spiral record path on the memory disk.

The phonograph disk on which the lesson or instructional material is prerecorded for use in the apparatus embodying this invention has essential characteristics distinguishing the same from conventional phonograph disks. More specifically, the spiral groove of the phonograph disk must have a relatively large pitch, between approximately .0125 and .020 inch, to ensure that the spiral recording path tracked on the memory disk by the magnetic recording and play-back head is of sufficient width to receive the magnetic recording. Further the depth of the spiral groove should be substantially greater than that commonly employed in micro-groove records, so as to ensure proper tracking by the pick-up stylus even though there is increased drag on the latter by reason of the interconnection between the pick-up and the magnetic head.

The above, and other objects, features and advantages of the invention, will be apparent in the following detailed description of an illustrative embodiment thereof which is to be read in connection with the accompanying drawings, wherein:

FIG. 3 is an enlarged fragmentary sectional view taken along the line 3—3 on FIG. 2;

FIG. 4 is a top plan view of an arm included in the apparatus;

FIG. 5 is a schematic view showing the several components of the apparatus embodying this invention.

Figure 1:
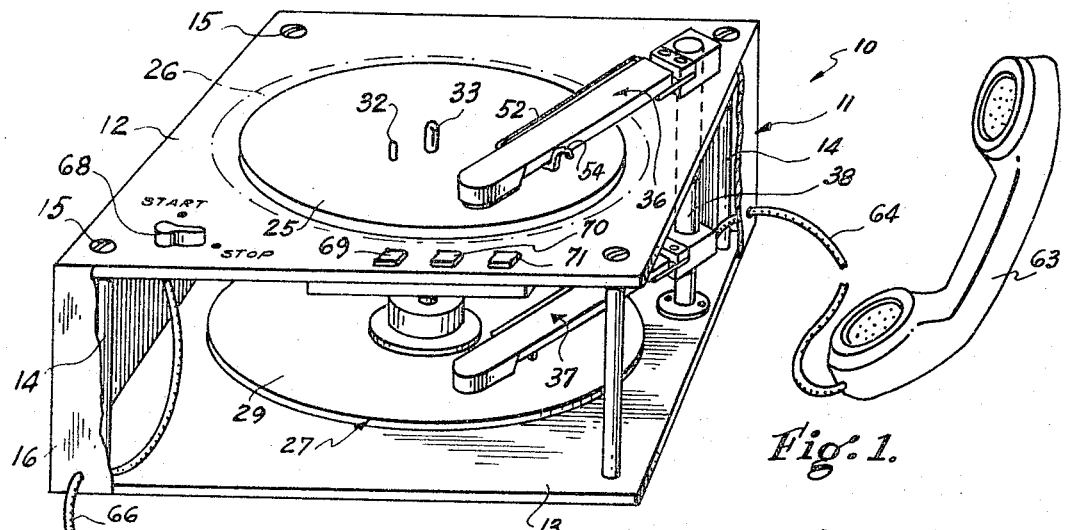
FIG. 1 is a prespective view of a teaching apparatus embodying this invention and which is shown with a portion of its casing broken away.
Figure 2:
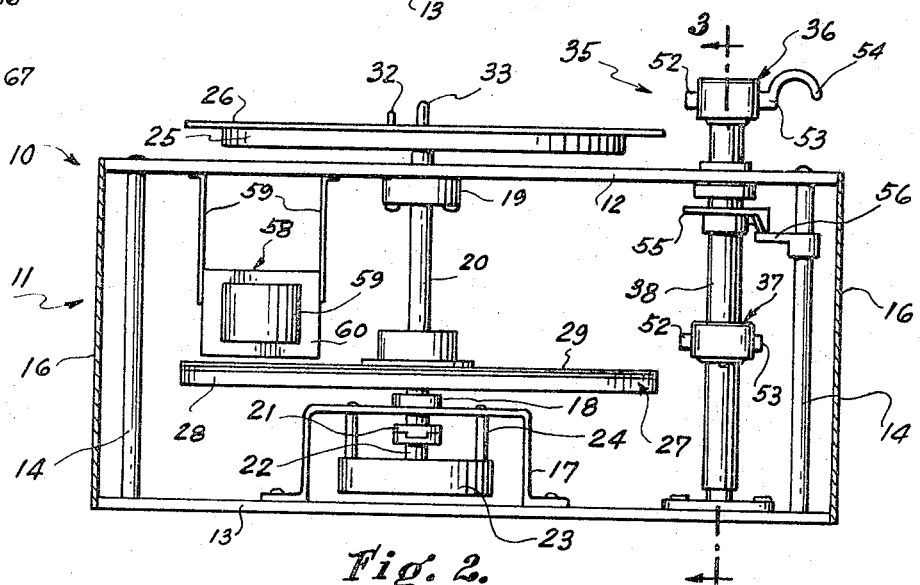
FIG. 2 is a front elevational view of the teaching apparatus, with the front portion of the casing removed.

Referring to the drawings in detail, and initially to FIGS. 1 and 2 thereof, it will be seen that a teaching apparatus embodying the invention and there generally identified by the reference numeral 10 comprises a casing 11 including a top wall or deck 12 supported in parallel spaced relation to a base 13, for example, by spacing rods 14 having their ends suitably secured to the base and deck, as by screws 15, and a peripheral wall 16 extending between the edges of the base and deck and suitably secured thereto.

An inverted U-shaped bracket 17 (FIG. 2) is secured on base 13 and, at its center, carries a bearing 18 which is in vertical alignment with a bearing 19 suspended from deck 12 approximately at the center of the latter. A vertical spindle 20 has its lower and upper end portions rotatably journaled in the bearings 18 and 19. The lower end portion of spindle 20 extends downwardly through bracket 17 and is connected by a coupling 21 which is preferably of shock absorbing material, such as, nylon or the like, to a drive shaft 22 of a drive unit 23 which is suspended, as at 24, within bracket 17. The drive unit 23 preferably includes a synchronous hysteresis electric motor 24 (FIG. 5), as in an electric clock, which drives shaft 22 through suitable reduction gearing (not shown) so as to effect rotation of spindle 20 at a suitable slow constant speed, for example, at a speed of 9 revolutions per minute.

The upper end of spindle 20 projects above deck 12 and has a turntable 25 secured thereon to support a phonograph disk 26 which will be described in detail hereinafter.

Also secured on spindle 20, at an axial location therealong between deck 12 and bracket 17, is a magnetic memory disk 27 which consists of a rigid, circular base or turntable 28 having a diameter at least equal to that of the phonograph disk 26 to be supported on turntable 25, and a film or coating 29 which may be permanently bonded to the upper surface of base 28 and is formed of a suitable plastic resin having red oxide dispersed therein so as to be magnetic. Since turntable 25 and magnetic memory disk 27 are both secured to spindle 20, it is apparent that they will rotate at exactly the same speed.

In order to ensure that the phonograph disk 26 supported on turntable 25 will not slip relative to the latter during operation of teaching apparatus 10, and will always occupy only a predetermined position with respect to memory disk 27, each phonograph disk 26 is preferably formed with an eccentrically located hole 30 in addition to the usual central hole 31 to respectively receive an eccentric pin 32 and the usual central locating pin 33 projecting upwardly from turntable 25. Alternatively, the fixed positioning of each phonograph disk on turntable 25 can be achieved by giving the central hole 31 of each phonograph disk 26 and the central locating pin 33 of turntable 25 mating keyhole-shaped configurations.

Figure 6:
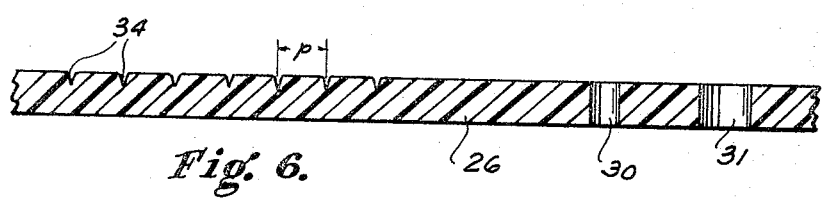
FIG. 6 is a fragmentary, enlarged sectional view of a phonograph disk employed in the teaching apparatus in accordance with this invention.

Each phonograph disk 26 is molded or otherwise formed, preferably of unbreakable plastic, so as to have a continuous spiral groove 34 (FIG. 6) in an operative portion of at least one surface of the disk. The spiral groove 34 has undulations therein at parts of the groove which are preferably spaced therealong, and such undulations represent instructional material or a lesson prerecorded on the phonograph disk. In accordance with this invention, the pitch $p$ of spiral groove 34, that is, the radial distance between successive turns thereof, is between .0125 and .020 inch, and preferably approximately .014 inch, whereas the depth of groove 34 is preferably at least .0025 inch, which depth is substantially greater than that of the grooves of conventional micro-groove records.

The apparatus 10 further comprises an arm assembly 35 that includes an upper arm 36, a lower arm 37 and a tube or sleeve 38 by which arms 36 and 37 are connected for movement as a unit. The tube 38 is rotatably and axially slidable on a shaft 39 (FIG. 3) extending vertically from a mounting flange 40 riveted or otherwise secured to base 13. Sleeve 38 is further guided in a bearing 41 mounted in an opening of deck 12 and through which the upper end portion of sleeve 38 extends. Arm 36 is secured on the upper end of sleeve 38 above deck 12 so as to be swingable horizontally across turntable 25 from an inoperative or rest position at one side of the turntable. The lower arm 37 is secured on sleeve 38 below deck 12 so as to be swingable horizontally across magnetic memory disk 27 from an inoperative position adjacent one side of the latter in response to similar swinging movement of upper arm 36.

As shown particularly on FIG. 3, each of the arms 36 and 37 preferably includes a mounting member 42 formed with a bore extending therethrough to receive sleeve 38 and having a set screw 43 by which the mounting member is secured on the sleeve. Each of the arms 36 and 37 further includes an elongated member 44 directed radially from mounting member 42 and suspended from the latter by means of a leaf spring 45. Each spring 45 may be constituted by a flat plate of resilient metal lying substantially in a horizontal plane and of substantial width so as to be capable of flexing only in the vertical direction. The end of the elongated member 44 remote from mounting member 42, that is, the free end portion of each of the arms 36 and 37, is preferably shaped to define a downwardly opening housing 46.

Suitably secured within the housing 46 of upper arm 36 is a conventional phonograph pick-up 47, for example, of the ceramic type, having a needle or stylus 48 projecting downwardly therefrom for engagement in the spiral groove 34 of a phonograph disk 26 supported on turntable 25. Similarly supported within the housing 46 at the free end portion of arm 37 is a magnetic recording and playback head 49 which is engageable with the magnetic coating of film 29 constituting the top surface of magnetic memory disk 27.

In order to permit adjustment of the contact pressures of the needle or stylus of pick-up 47 on phonograph disk 26 and of the magnetic head 49 on memory disk 27, each of arms 36 and 37 may be further provided with a weight 50 slidable along elongated member 44 and held in adjusted position on the latter, for example, by a set screw 51 (FIG. 3).

Each of arms 36 and 37 also has a rigid support bracket 52 extending from the respective mounting member 42 longitudinally along one side of the elongated member 44 and terminating in a laterally directed end portion 53 disposed under elongated member 44 so as to limit downward swinging or sagging of elongated member 44 relative to mounting member 42. A handle 54 (FIGS. 1 and 2) extends from the laterally directed end portion 53 of the support bracket of upper arm 36 to provide means by which the arm assembly 35 can be manipulated, that is, angularly displaced about the axis of shaft 39 and also vertically raised or lowered as a unit. When handle 54 is raised, both brackets 52, which are rigidly connected through mounting members 42 and sleeve 38, move upwardly, as a unit, to engage their laterally directed end portions 53 against the undersides of elongated members 44 of the respective arms 36 and 37 and thereby lift pick-up 47 and magnetic head 49 from the phonograph disk and memory disk, respectively.

Further, apparatus 10 preferably has an arrangement for holding arm assembly 35 in an elevated position, that is, with pick-up 47 and head 49 respectively spaced upwardly, by the distance $l$ (FIG. 3), from the plane of the upper surface of a phonograph disk on turntable 25, as indicated at 26', and from the plane of the upper surface of memory disk 27, as indicated at 29', so long as the arm assembly is angularly positioned to dispose pick-up 47 and head 49 at inoperative positions outside the peripheries of phonograph disk 26 and memory disk 27. As shown particularly on FIGS. 2 and 3, such arrangement may include a cam member 55 secured on sleeve 38 and engageable from above with an abutment 56 suitably fixed on the adjacent spacing rod 14. The cam 55 is contoured so that, when arm assembly 35 is angularly disposed to position pick-up 47 and head 49 outside the peripheries of the phonograph disk and memory disk, respectively, the engagement of cam 55 with abutment 56 limits the downward movement of sleeve 38 to the position shown on FIGS. 2 and 3, in which position the lower end of sleeve 38 is spaced from the mounting flange 40 of shaft 39 by the distance L (FIG. 3) which is greater than the distance $l$ at which brackets 52 of arms 36 and 37 hold pick-up 47 and head 49 above the planes 26' and 29', respectively. When arm assembly 35 is angularly displaced to dispose pick-up 47 and head 49 within the peripheries of phonograph disk 26 and memory disk 27, cam 55 permits downward movement of sleeve 38 through the distance L, that is, to engage its lower end against flange 40 and thereby permit engagement of pick-up 47 and head 49 with the phonograph disk 26 and with the magnetic film or coating 29 of memory disk 27. Upon such engagement of the pick-up and head with the phonograph disk and memory disk, the laterally directed end portions 53 of support brackets 52 move downwardly away from the elongated members 44 of the respective arms so that such elongated members 44 are then free to be angularly displaced to a small extent in the vertical direction by flexing of the respective leaf springs 45, and thereby accommodate any vertical irregularities in the surfaces of the phonograph disk and memory disk. The upward movement of arm assembly 35 relative to casing 11 may be conveniently limited by a collar 57 (FIGS. 2 and 3) secured on sleeve 38 and engageable against the underside of deck 12.

The teaching apparatus 10 embodying this invention further generally comprises a bulk erasing device 58 (FIG. 2) suspended, as by brackets 59, from the underside of deck 12 so as to be disposed immediately above the magnetic film of memory disk 27 and being constituted by a coil 59 wound on a core structure 60. The erasing device 58 is operative to generate a magnetic field for erasing any magnetic recording on the film 29 when memory disk 27 is rotated and energizing current is supplied to the coil 59.

Also included in teaching apparatus 10 are a microphone 61 constituting a transducer capable of converting audible sound into corresponding electrical signals, and an earphone or receiver 62 constituting a transducer capable of converting electrical signals into audible sound (FIG. 5). Preferably, the microphone 61 and earphone 62 are conveniently embodied in a hand set 63 (FIG. 1) having a cable 64 extending to the casing 11 for accommodating the conductors leading to the microphone and earphone. As indicated schematically at 65 on FIG. 5, suitable conventional circuitry, which is preferably transistorized and disposed within casing 11, is electrically connected to pick-up 47, head 49, bulk erasing device 58, microphone 61 and earphone 62, and also adapted to be connected to electrical supply lines by way of a cable 66 extending from casing 11 (FIG. 1) and terminating in a plug 67. A switch 68 is provided for controlling the operation of the motor 24 which effects rotation of turntable 25 and memory disk 27 and also for controlling the supplying of line current to the circuitry 65. The circuitry 65 generally includes switches having actuators 69, 70 and 71, preferably exposed above the deck 12, as shown on FIG. 1.

The circuitry 65 is arranged to effect energization of bulk erasing device 58 when switch actuator 69 is depressed or otherwise manipulated, thereby to erase or eradicate any magnetic recording previously applied to the magnetic film on magnetic memory disk 27. Depression or manipulation of switch actuator 70 establishes connections, within circuitry 65, from pick-up 47 to earphone 62 and also, if desired, to magnetic recording and play-back head 49, and from microphone 61 to head 49. Finally depression or manipulation of switch actuator 71 establishes connections with circuitry 65, from magnetic recording and playback head 49 to earphone 62. In the case where manipulation of switch actuator 70 establishes connection from pick-up 47 only to earphone 62, then manipulation of switch actuator 71 also establishes a connection from pick-up 47 to the earphone 62.

In operating the above described teaching apparatus embodying this invention, a phonograph disk 26 having a lesson or instructional material prerecorded in the form of undulations in spaced apart parts of its spiral groove is placed on turntable 25, and switch 68 is closed to cause operation of motor 24 for simultaneously rotating the phonograph disk with turntable 25 and memory disk 27, and to supply current to circuitry 65.

Switch 70 is thereafter depressed or manipulated and arm assembly 35 is manually displaced from its inoperative position so as to engage stylus 48 of pick-up 47 with the beginning or outermost turn of the spiral groove in phonograph disk 26. By reason of the mechanical connection of arm 37 with arm 36, the magnetic recording and play-back head 49 is simultaneously positioned on the magnetic film of memory disk 27 adjacent the periphery of the latter. In response to rotation of phonograph disk 26 with turntable 25, the stylus or needle 48 of pick-up 47 tracks the spiral groove of the phonograph disk and thereby causes radially inward movement of the pick-up across the phonograph disk. In response to such radial inward movement of pick-up 47, arm assembly 35 is angularly displaced so that head 49 tracks a spiral record path on memory disk 27 which corresponds to the spiral groove of the phonograph disk 26.

When stylus or needle 48 engages a part of spiral groove 34 having instructional material or a fragment of the lesson prerecorded therein in the form of undulations, such undulations cause pick-up 47 to generate corresponding electrical signals which are suitably amplified in circuitry 65 and converted to audible sound by the transducer or earphone 62. As described above, the electrical signals from pick-up 47 may also be fed to the magnetic head 49 so as to produce a magnetic record of the instructional material or fragment of the lesson in a corresponding part of the spiral record path on memory disk 27. When the needle or stylus of pick-up 47 is engaged by a blank part of groove 34, that is, a part having no instructional material prerecorded therein, the student responds to the previously heard information by talking into the microphone or transducer 61 and the latter converts such audible sound into corresponding electrical signals which are suitably amplified in circuitry 65 to energize the magnetic head 49 which thereby provides a magnetic recording of the response in the corresponding part of the spiral record path on memory disk 27.

At any point in the lesson, the student can lift arm assembly 35 and angularly displace the same for engaging the stylus of pick-up 47 with any desired part of groove 34, for example, with a previously traversed part of the groove, and for locating magnetic head 49 at an exactly corresponding part of the spiral record path on the memory disk. Such lifting and angular displacement of arm assembly 35 may be for the purpose of permitting the student to listen to previously heard portions of the lesson or instructional material and the responses thereto, and, in that case, the switch actuator 71 is depressed or manipulated prior to return of the pick-up stylus 48 to the phonograph disk so that earphone 62 then provides audible sounds corresponding to electrical signals representing the instructional material and responses. Such signals for energizing the earphone 62 may be generated either by the magnetic head 49 alone, or by the head 49 and the pick-up 47.

If the student wishes to revise any of the responses to the instructional material that have been magnetically recorded on memory disk 27, then the arm assembly 35 is suitably relocated and the switch actuator 70 is depressed so that, when the student orally presents the revised response into microphone 61, the magnetic head 49 erases the previously recorded response and magnetically records the revised response in the desired part of the spiral record path on memory disk 27.

It will be apparent that, at all times, the spiral groove 34 of phonograph disk 26 acts as a feed screw for both the pick-up 47 and the magnetic head 49 by reason of the relatively fixed angular positioning of arms 36 and 37, and that the mechanical connection between arms 36 and 37 further insures the synchronous positioning of the pick-up and magnetic head with respect to material recorded on phonograph disk 26 and on memory disk 27.

The purpose of the relatively large pitch of spiral groove 34 in phonograph disk 26 is to ensure that the spiral record path tracked on memory disk 27 by magnetic head 49 will be of sufficient width for magnetic recording therein by the head. Further, the relatively great depth of groove 34 ensures that the stylus or needle 48 of pick-up 47 will accurately and reliably track that groove notwithstanding the additional drag on the stylus or needle resulting from the fact that arm 37 carrying magnetic head 49 is coupled with arm 36 for angular displacement with the latter in response to tracking of the groove.

At the completion of a lesson, that is, when the needle or stylus of pick-up 47 has reached the innermost turn of groove 34, the arm assembly 35 can be lifted and angularly relocated to position the needle or stylus at the outermost turn of groove 34, and the student can then depress switch actuator 71 to permit listening to the entire lesson and all of the responses thereto. Thereafter, switch actuator 69 can be depressed to energize the bulk erasing device 58 and thereby erase or clear the entire magnetic record from memory disk 27. However, if desired, the magnetic record on disk 27 can be left undisturbed at the conclusion of a lesson, and such magnetic record will be automatically erased by magnetic head 49 when the apparatus 10 is subsequently employed in connection with another lesson.

It will be apparent that the teaching apparatus 10 embodying this invention has the general appearance and operating characteristics of a simple record player, in that memory disk 27 and its associated arm 37 and head 49 are enclosed within casing 11 and require no attention by the student or other user of the apparatus. Further, it will be apparent that the construction and operation of the apparatus 10 are extremely simple and are particularly adapted to satisfy the functional requirements of a teaching apparatus in permitting the sequential auditing of instructional material and the recording of responses thereto. Since the prerecorded lesson or instructional material is provided on a spirally grooved phonograph disk which may be conveniently produced by pressing or molding of an unbreakable plastic material, such phonograph disk may be produced at relatively low cost and conveniently and safely mailed to a student in connection with a home study or correspondence course.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In a teaching apparatus, the combination of a rotary turntable for supporting a spirally grooved phonograph disk having instructional material prerecorded thereon, pick-up means having a stylus engageable with a grooved phonograph disk on said turntable to track the groove of the phonograph disk upon rotation of the latter with the turntable and operative to produce electrical signals corresponding to the material prerecorded on the phonograph disk, a magnetic memory disk coupled with said turntable to rotate coaxially therewith, a magnetic recording and playback head operable selectively to record magnetically on said memory disk and to produce electrical signals corresponding to a magnetic record on the memory disk, and mechanical means connecting said magnetic recording and playback head with said pick-up means so as to cause said head to track a spiral recording path on said memory disk which corresponds to the spiral groove of a phonograph disk on said turntable.

2. In a teaching apparatus for reproducing previously recorded instructional material and for recording and reproducing a student's responses thereto, the combination of a rotary turntable for supporting a spirally grooved phonograph disk having the prerecorded instructional material thereon, a first arm movably mounted adjacent said turntable and carrying pick-up means having a stylus engageable with a grooved phonograph disk on said turntable to track the groove of the phonograph disk upon rotation of the latter with the turntable, said pick-up means being operative to generate electrical signals corresponding to the material prerecorded on the phonograph disk for reproducing the same, a magnetic memory disk coupled with said turntable to rotate coaxially therewith, a second arm movably mounted adjacent said memory disk, a magnetic recording and playback head carried by said second arm and being operative selectively to provide a magnetic record on said memory disk of at least the student's responses to the reproduced instructional material and to generate electrical signals corresponding to said magnetic record for reproducing the same, and mechanical means connecting said second arm with said first arm to move with the latter so that said magnetic recording and playback head tracks a recording path on said memory disk that corresponds to the spiral groove of a phonograph disk on the turntable.

3. In a teaching apparatus, the combination of a rotary turntable, a spirally grooved, prerecorded phonograph disk supported by said turntable and rotatable therewith, pick-up means having a stylus, mounting means supporting said pick-up means for movement of said stylus toward and away from said phonograph disk and for movement generally radially across the latter so that said stylus of the pick-up means can be engaged with the spiral groove of said phonograph disk at any desired location along the groove to track the latter and be actuated thereby in response to rotation of the disk with the turntable, a magnetic memory disk coupled with said turntable to rotate coaxially therewith, a magnetic recording and playback head operable selectively to record magnetically on said memory disk and to generate playback electrical signals corresponding to a magnetic record on said memory disk, mounting means supporting said head for movement toward and away from said memory disk and for movement generally radially across the latter, and mechanical means connecting said mounting means of the magnetic recording and playback head with said mounting means of the pick-up means to cause said head to follow at least said movement of said pick-up means generally radially across the phonograph disk and thereby similarly track a spiral recording path on said memory disk that corresponds to said spiral groove of the phonograph disk.

4. In a teaching apparatus, the combination as in claim 3; wherein said spiral groove of the phonograph disk has a pitch between approximately .0125 and .020 inch, measured radially, so as to provide sufficient pitch between adjacent turns of said spiral recording path on the memory disk for magnetic recording by said head.

5. In a teaching apparatus, the combination as in claim 4; wherein said pitch of the spiral groove is approximately .014 inch.

6. In a teaching apparatus having first transducer means for converting electrical signals into audible sound and second transducer means for converting audible sound into electrical signals, the combination of a rotary turntable, a phonograph disk removably supported on said turntable to rotate with the latter and having a spiral groove with instructional material prerecorded therein in the form of undulations of the groove, pick-up means mounted for movement toward and away from said phonograph disk and generally radially across the latter, said pick-up means having a stylus engageable in said groove to trck the groove and be actuated thereby in response to rotation of said phonograph disk with the turntable so as to cause said pick-up means to generate electrical signals for conversion into audible sound by said first transducer means, a magnetic memory disk coupled to said turntable for coaxial rotation therewith, and a magnetic recording and playback head disposed adjacent said memory disk and connected mechanically with said pick-up means to follow movements of the latter and thereby track a spiral record path on said memory disk which corresponds to said spiral groove of the phonograph disk, said magnetic head being selectively operable by electrical signals from said pick-up means and from said second transducer means to provide a magnetic record thereof in said spiral path on the memory disk and by said magnetic record to generate electrical signals for conversion to audible sound by said first transducer means.

7. In a teaching apparatus, the combination as in claim 6;
   wherein said instructional material is prerecorded along spaced portions of said spiral groove.

8. In a teaching apparatus, the combination of a support structure including an upper deck, a vertical spindle journalled in said support structure and extending above said deck, a turntable rotatably secured on the upper end of said spindle and being adapted to support a phonograph disk having a spiral groove with instructional material prerecorded thereon in the form of undulations in said groove, motor means for rotating said turntable, a magnetic memory disk below said deck and coupled with said turntable to rotate coaxially therewith, a shaft mounted in said support structure and extending parallel to said spindle outside the peripheries of said turntable and memory disk, upper and lower arms respectively disposed above and below said deck and mounted, at one end, to swing about the axis of said shaft and also to move in the direction of said axis of the shaft, means connecting said lower arm to said upper arm to follow at least the swinging movements of the latter about said axis of the shaft, pick-up means carried by the free end portion of said upper arm and including a stylus engageable at any location in the spiral groove of a phonograph disk on said turntable to track such groove and be actuated by the undulations therein, and a magnetic recording and playback head carried by the free end portion of said lower arm to track a spiral record path over said magnetic memory disk in response to the tracking of the spiral groove of a phonograph disk by said stylus of the pick-up means.

9. In a teaching apparatus, the combination as in claim 8;
   wherein said means connecting the lower arm to the upper arm includes a sleeve slidably telescoping over said shaft and having said one end of each of the arms secured thereto.

10. In a teaching apparatus, the combination as in claim 9;
    wherein each of said upper and lower arms includes a mounting member at said one end which is secured to said sleeve, a rigid elongated member constituting the remainder of the arm, a leaf spring connecting said elongated member to said mounting member and being flexible only vertically.

11. In a teaching apparatus, the combination as in claim 10;
    wherein said upper arm further includes a handle member extending from said support bracket and by which said upper and lower arms can be manipulated simultaneously.

12. In a teaching apparatus, the combination as in claim 10; wherein said elongated member of each of said arms has a weight adjustable therealong for varying the pressure of said pick-up means and said head on the respective disks.

13. In a teaching apparatus, the combination as in claim 8;
    wherein said motor means includes a hysteresis electric motor and speed reduction gearing unit having a drive shaft, and shock-absorbing coupling means connecting said drive shaft directly to said spindle.

14. In a teaching apparatus, the combination of a rotatably supported spindle,
    a turntable rotatable on said spindle and having an upper surface adapted to support a phonograph disk having an operative portion with a continuous spiral groove in which information is prerecorded in the form of undulations in the groove, a magnetic memory disk coupled with said turntable to rotate coaxially therewith and being spaced axially from said upper surface of said turntable, an arm assembly mounted for movement about an axis parallel to said spindle and including two arms which are spaced apart along said axis and extend substantially radially from said axis in fixed angular relation to each other, pick-up means carried by one of said arms and having a stylus engageable in the groove of a phonograph disk on said turntable to track the groove, said pick-up means being operative to generate electrical signals when said stylus is actuated by undulations in the groove of the phonograph disk, and a magnetic recording and playback head carried by the other of said arms to track a spiral recording path on said memory disk when the stylus of said pick-up means tracks the spiral groove of a phonograph disk on the turntable.

References Cited
UNITED STATES PATENTS

| | | | |
|---|---|---|---|
| 1,877,625 | 9/1932 | Loughridge | 274—10 |
| 2,034,105 | 3/1936 | Loughridge | 274—10 |
| 3,059,347 | 10/1962 | Warner et al. | 35—35.3 |
| 3,059,348 | 10/1962 | Mezzacappa | 35—25.3 |
| 3,086,297 | 4/1963 | Kantrowitz | 33—35.3 |

EUGENE R. CAPOZIO, *Primary Examiner.*

W. GRIEB, *Assistant Examiner.*